March 23, 1954 W. P. ADAMS 2,672,721
HAYRAKE
Filed April 26, 1950 3 Sheets-Sheet 1
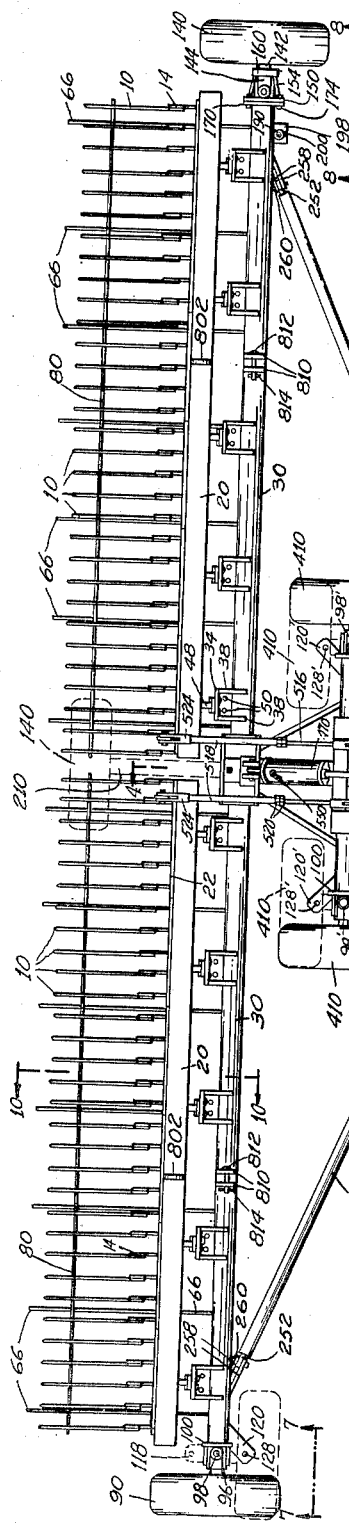
Fig. 1.
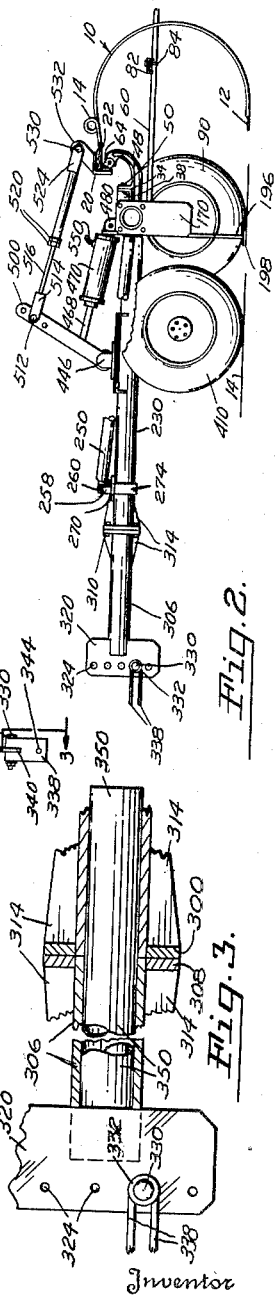
Fig. 2.
Fig. 3.
Inventor
Wayne P. Adams
by A. Hiram Sturges
AGENT

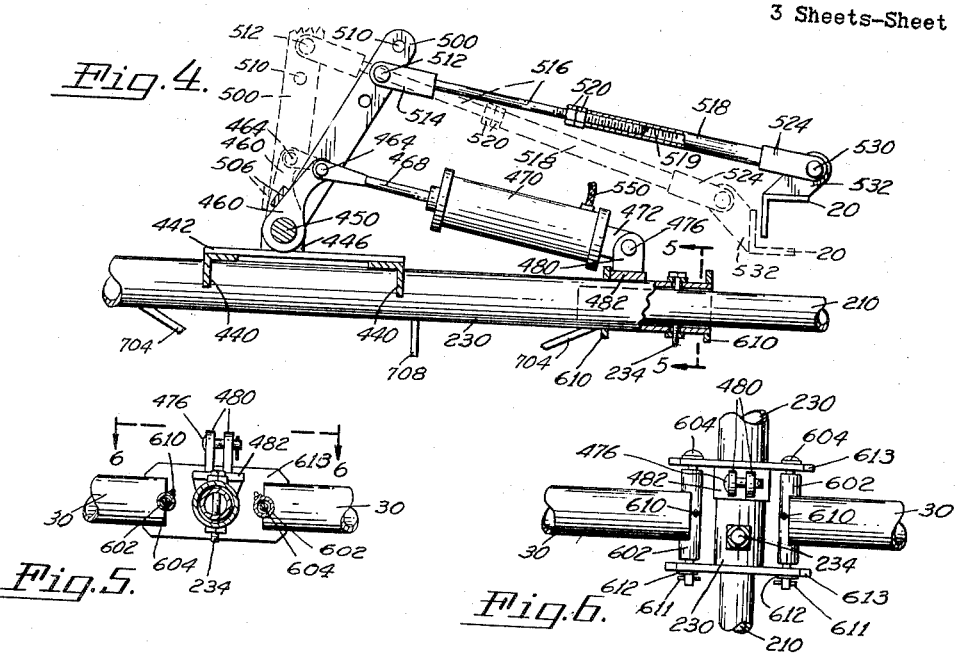
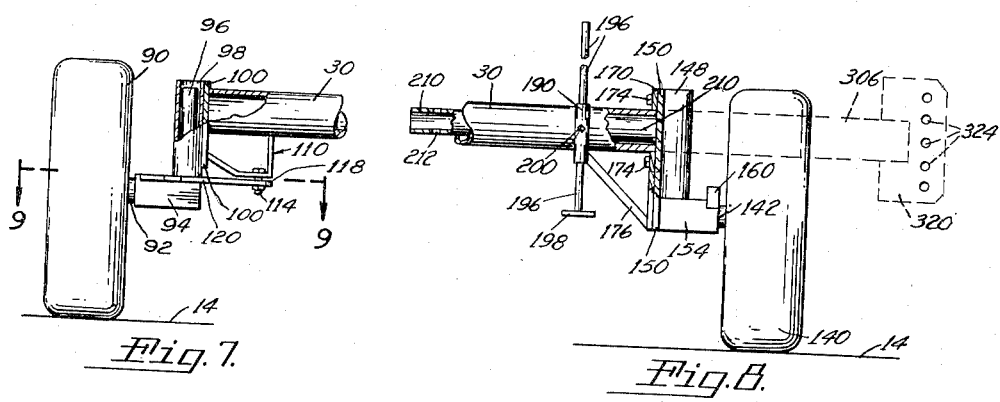
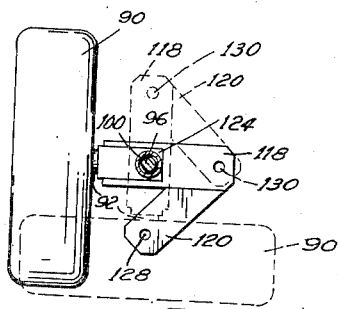

March 23, 1954  W. P. ADAMS  2,672,721
HAYRAKE

Filed April 26, 1950  3 Sheets-Sheet 3

Inventor
Wayne P. Adams
by A. Hiram Sturges
AGENT

Patented Mar. 23, 1954

2,672,721

UNITED STATES PATENT OFFICE 2,672,721

HAYRAKE

Wayne P. Adams, Alliance, Nebr., assignor of one-half to Willia Edna Worden and Floyd O. Worden, as joint tenants, Alliance, Nebr.

Application April 26, 1950, Serial No. 158,147

4 Claims. (Cl. 56—384)

This invention relates to hayrakes and more particularly it is an object of this invention to provide a hayrake adapted for use in fields in which varying conditions are encountered.

In western Nebraska and some other parts of the country there are hay fields of large size in which hay is in some parts of twice the height it is in other parts. Because of this condition it has been very difficult in the past to provide a suitable hayrake. Other factors are the irregular surfaces of the ground in such fields and the sinking of towing tractors into bogs.

It is, therefore, an object of this invention to provide a hayrake which is provided with a more reliable hold down mechanism than heretofore whereby the rake will pull greater amounts of hay, raking cleaner and closer to the ground than heretofore.

Still another object is to provide a hayrake having a readily adjustable hold down mechanism whereby the height of the teeth can be regulated so that at times when the assembly sinks into a bog, the teeth can be quickly raised. This feature improves upon prior art rakes in which the teeth dump the hay load even at times when it is only necessary to raise the teeth a short distance.

Still another object resides in the elimination of spring hold down means by the provision of a positive hydraulic hold down mechanism.

Yet a further object of the invention is to provide a hayrake having a holddown mechanism readily adjustable for raising the teeth in order to clear rocks, stumps, and other obstructions.

Still another object is to provide a hayrake without caster mounted wheels and without side delivery of hay into a windrow for eliminating the undesirable features of such machines.

Yet a further object of the invention is to provide an improved hanger and hanger bracket construction.

A further object resides in the provision of a new and improved way to attach cleaner rods to such hayrakes.

A further object resides in the use of a hydraulic ram to hold the teeth of a rake downward.

A further object resides in the provision of a rake which can be trailed behind a vehicle at highway speed.

Still another object resides in the provision of a rake which is collapsible to size suitable for highway travel.

Another object is to provide a hayrake adapted to be used behind any suitable towing vehicle.

Still another object is to provide a rake having a hold down mechanism so efficient that it is unnecessary to dump hay into a windrow as often as formerly.

Still a further object resides in the provision of a rake which is adapted to rake clean even after it is filled beyond the capacity of rakes of the prior art.

An additional object of the invention resides in the provision of wheel attachment means whereby the wheels of the rake can be easily shifted from raking position to trailing position.

Yet a further object resides in the provision of a trailable hayrake having three wheels on one of its sides and a single wheel on its opposite side during trailing.

Yet another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

In the drawings:

Figure 1 is a top plan view of the hayrake, dotted lines indicating trailing positions of wheels.

Figure 2 is a side view of the device with a detachable wheel removed.

Figure 3 is an enlarged sectional view of the trailer hitch and adjacent parts. This view is a section taken along the line 3—3 of Figure 1.

Figure 4 is an enlarged view-in-section taken along the line 4—4 as shown in Figure 1.

Figure 5 is a partial section of the axle hinge mechanism taken along the line 5—5 of Figure 4.

Figure 6 is a plan view of Figure 5.

Figure 7 is an enlarged view, partly in section, of the left-hand wheel as shown in Figure 1, and taken along the line 7—7.

Figure 8 is an enlarged view, partly in section, of the removable right hand wheel as shown in Figure 1.

Figure 9 is a section through the wheel shown in Figure 7, taken along the line 9—9.

The hayrake of this invention is best seen in Figure 1 and includes a plurality of teeth 10.

Figure 10:
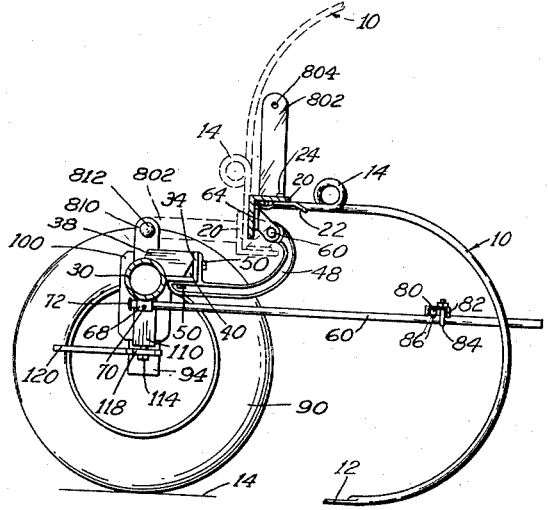
Figure 10 is an enlarged section through the axle and rake along the line 10—10 in Figure 1.

The teeth 10 are disposed in a transverse row and are supported above the ground with their lower ends extending downwardly to the surface of the ground for raking. As best seen in Figure 10, each tooth 10 is of arcuate shape having a concave forward side terminating at its lower end in a flat portion generally indicated at 12. The portion 12 is disposed in use closely adjacent the surface of the ground 14.

Each tooth 10 is constructed of resilient material and is preferably provided with a loop 14 disposed therein adjacent the top thereof for adding to its resiliency. The uppermost end of each tooth 10 is suitably secured to one of two elongated transverse right angle members 20. Such securing means preferably comprises a clip 22 which latter extends beneath the tooth 10 and on the sides thereof. The clip 22 is secured to the angle 20 by means of bolts 24.

The teeth 10 are disposed in parallelism and are equidistantly spaced apart all along the two angle members 20. The angle members 20 are disposed end to end in alignment and are attached to two half-axle portions 30 by suitable means now to be described.

As best seen in Figure 10 a short right angle member 34 is disposed to the rearward of the axle portions 30. Like angle members 34 are disposed in spaced apart positions all along the axle 30. The angle members 34 are attached to the axles 30 by means of web members 38. The web members 38 are disposed and apertures 40 are provided between each web member 30 and adjacent surfaces of the angle members 34.

As seen in Figure 10, two spaced apart parallel web members 38 are provided for each angle member 40. On the rearward and lower sides of the angle members 34, each of the latter is provided with a hook shaped connecting member 48 which latter is provided with two forward surfaces disposed at right angles with respect to each other. The latter are disposed against the back and under sides of the angle member 34. Bolts 50 are provided for securing the members 48 to the angle members 34.

The members 48 each extend rearwardly, upwardly, then slightly forwardly in a hook, the forward end of each hook being provided with an aperture therethrough for receiving a bolt 60. The bolts 60 each secure the respective hook member 48 to two spaced apart ears 64 which latter are themselves suitably secured to the downwardly extending rearward surfaces of the angle members 20.

The rake is further provided with a plurality of rearwardly extending cleaning rod supports 66 which latter are disposed in spaced apart parallelism with each other. The cleaning rod supports 66 extend between the teeth 10 for the purpose of combing hay therefrom at times when the teeth 10 are raised, as best illustrated in detail in Figure 10.

It will be seen that the forward ends of the supports 60 are attached to the underside of the axle pipes 30 by means of clips 68 which latter extend around the rods 60 and are provided with pins 70 for locking each rod 60 in the clip 68. The forward end of each rod is provided with a head 72.

Two transverse cleaning rods 80 are provided and the latter extend across the tops of the rod 60 forwardly of the teeth 10. The rods 80 are secured to the rods 60 by means of clips 82, and eye bolts 84. Each rod 60 is provided with a notch 86 for receiving a rod 80.

The axles 30 are preferably formed of pipe and are supported at their outer ends by two unlike wheel assemblies. The wheel assembly shown at the left in Figure 1 is illustrated in detail in Figure 7.

In Figure 7 the wheel assembly shown includes a wheel 90 having an axle 92 mounted in an axle supporting block 94. An upstanding post 96 is secured to the block 94 and extends upwardly through a sleeve 98. The sleeve 98 is vertically disposed and is rigidly secured to a plate 100 which latter is rigidly secured to the outer end of the adjacent axle pipe 30.

On the underside of the axle pipe 30 a bracket 110 is provided. The bracket 110 extends downwardly from an inner portion of the axle 30, then extends outwardly a short distance, then upwardly at an inclination, being attached on its terminal inclined end to the plate 100.

The bracket 110 is secured by means of a bolt 114 to a toggle member 118. The member 118 is substantially obscured in Figure 7 by a link 120. The toggle member 118 is provided with a notch 124 therein which latter is disposed around and secured to the top of the block 94.

The link 120 is welded or otherwise suitably secured to the inner end of a toggle member 118 and is disposed inclined forwardly and outwardly therefrom. The forwardmost end of the link 120 is provided with an aperture 128. The purpose of the aperture 128 is to receive the bolt 114 at times when the device is in a trailing position.

As best seen in Figure 1, certain positions of the wheel are shown in dotted lines. These are the trailing positions thereof used when the device is being towed on the highway.

Referring to Figures 7 and 9, when the wheel 90 is placed in the dotted line position, the members 118 and 120 move rearwardly, and the aperture 130 which extends through the inner end of the member 118 is not used. In its stead, the bolt 114 is placed through the aperture 128 for attaching the link 120 to the bracket 110.

The wheel 140 on the opposite right hand end of the axle is similarly provided with a stub axle 142 attached to a block 144. The block 144 is welded or suitably secured to a standard 148 which latter is secured to a plate 150, the latter being attached to the outer end of the adjacent axle pipe 30. Two brace members 154 are provided, one forwardly and one rearwardly of the block 144. The braces 154 are attached rigidly to the block 144 on their outer ends and are attached on their inner ends to the plate 150.

A brace securing piece 150 is disposed across the top of the braces 154 and extends downwardly on the forward and rearward sides thereof. The member 160 is preferably welded in this position.

A strengthening plate 170 is provided as shown in Figure 8. The plate 170 is secured by means of bolts 174 to the plate 150 and the axle 30 is welded to the member 170.

The assembly is further braced by means of a strut 176, secured to the lower end of the member 170, and the strut extends inwardly and upwardly therefrom, being secured to the axle 30.

Means are provided for holding the axle 30 above the ground at times when the wheel 140 is removed. Such means includes a sleeve 190 secured vertically to the axle 30 adjacent the wheel 140. A standard 196 is slidably disposed through the sleeve 190 and has a foot 198 on its lower end for engaging the ground. A bolt 200 is provided through the sleeve for securing the standard 196 in a desired position.

An inner pipe, or rounded bar 210 is disposed in the right hand outer end of the axle 30. The pipe 210 is provided with a vertical bore 212 therethrough for a purpose later described. The bar 210 is secured at its outer end to the plate 150. It will be seen that by removing the bolt 174, the wheel 140 and associated parts including the bar 210 can be removed.

The purpose of this removal is best seen in Figure 1, in which the wheel 140 is placed under the teeth 10 adjacent the transverse center of the rake. The wheel 140 is there shown in trailing position and the bar 210 extends rearwardly from a forwardly and rearwardly extending pipe frame member 230, which latter is best seen in Figure 4.

Referring to Figure 4, the member 210 is shown extending into the rearward end of the pipe 230 and is secured in that position by means of a bolt 234 which latter extends through the pipe 230 and the bar 210. The bolt 234 has its nut on the lower end welded to the longitudinal 230. On the upper end of the bolt a washer is provided. The position of the bar 210 in Figure 4 corresponds to the dotted line position thereof shown in Figure 1.

The main longitudinal pipe 230 is braced in a position at a right angle to the axles 30 by means of two elongated bracing pipes 250. Each pipe 250 extends forwardly and inwardly from an outer end of an axle 30. The pipes 250 are provided at each end with a welded plate 252 secured thereto. The purpose of the plates 252 are for reception between tabs 258 which latter, together with the bolts 260, attach the ends of the pipe respectively to the axles 30 and to a connecting plate 270. The connecting plate 270 is also shown in Figure 2. Two braces 274 are provided for securing the plate 270 to the pipe 230.

It will be seen that the bolts 260 should be in alignment with the axes about which the inner ends of the axles 30 pivot, as later described. For this reason the plates 252 are disposed substantially in parallelism with the axles 30 transversely of the rake and the tabs 258 are similarly disposed in parallelism with the plates 252.

As best seen in Figures 1 and 3, the longitudinal pipe 230 is provided at its forward end with a flange 300 and a longitudinal pipe extension 306 extends forwardly of the pipe 230. The extension 206 is provided with a rearward flange 308 which latter is secured by means of bolts 310 to the flange 300. Webs 314 are provided for strengthening the flanges 300 and 308.

The extension 306 is provided at its forward end with a vertically disposed plate 320 which latter is placed in a slot in the forward end of the extension 306 and is suitably welded thereto. The plate 320 is provided with a plurality of apertures 324 therethrough. The apertures 325 are spaced apart in a vertical row. The purpose of the apertures is for receiving a bolt 330 having a washer 332 disposed thereon. The bolt 330 is disposed through the looped rearward end of a towing linkage 338.

The linkage 338 has two forwardly extending portions disposed in spaced apart parallelism with each other. The linkage 338 is provided with a notch therein as indicated at 340 in Figure 1. The purpose of the notch 340 is for receiving the forward edge of the vertical plate 320. The forward end of the linkage 338 is provided with an aperture 344, shown in Figure 1, which latter is for receiving a bolt in the attachment of the linkage 338 to a towing tractor.

As best seen in Figure 3, the pipe 350 is disposed extending inwardly from the plate 320 to the extension 306 and into the longitudinal pipe 230. The pipe 350 is welded or suitably secured at its outer end to the plate 320 whereby at times when the extension 306 is removed from the longitudinal pipe 230, the pipe 350 comes out with the pipe 306.

As best seen in Figure 8, the dotted lines there shown represent the extension 306 and plate 320 as disposed in a position for highway travel. When so disposed, the pipe 350 seen in Figure 3 is inserted into the pipe 30 shown in Figure 8 at a time when the wheel 140 and associated parts are removed.

Figure 11:
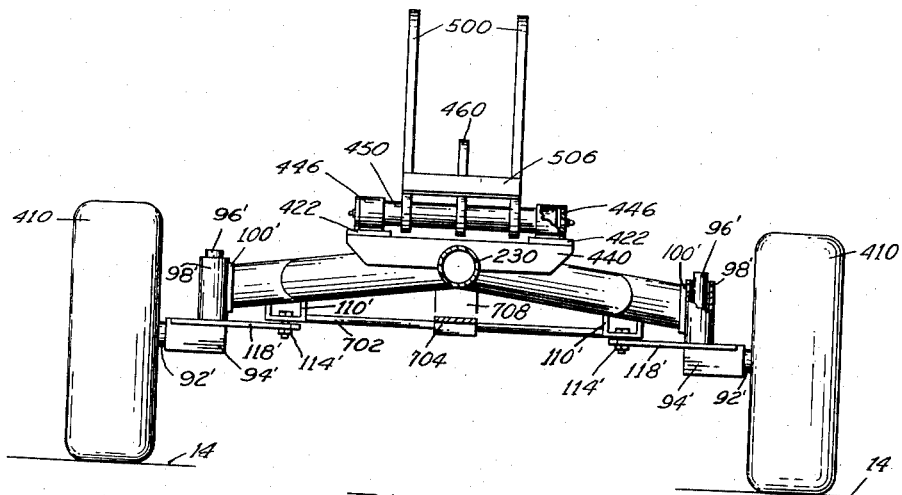
Figure 11 is a partial enlarged section showing the front view of the hold-down mechanism, taken along the line 11—11 of Figure 1.

Referring to Figure 1, two spaced apart front axle pipes 400 are provided. The pipes 400 are disposed in alignment transversely of the direction. The axle pipes 400 are sloped downwardly at their outer ends as best shown in Figure 11. Two wheels 410 are attached to the ends of the axle pipes 400. The wheels are attached in the same manner in which the wheel 90 is secured to the axle pipe 30 as is more fully described in Figure 7. For this reason the wheel assembly areas of the wheels 410 are only given the general numeral 420 as designated.

All parts of the wheel assembly of the wheels 410 which are similar to the wheel assembly of the wheel 90, as shown in Figure 7 are given similar, but prime numerals, as best seen in Figure 11.

The axle pipes 400 are held in position by means of two forwardly and inwardly extending braces 430 which latter interconnect the pipe axles 400 and the longitudinal frame pipes 230.

Above the pipes 230 and between the wheels 410, a platform is provided. The said platform comprises two transverse elongated angle members 440. The latter are suitably secured to the pipe 230.

Above the transverse platform members 440 and at the ends thereof, two longitudinal platform members 442 are secured. The members 442 are for the purpose of supporting two spaced apart bearings 446. The bearings 446 are for the purpose of supporting a shaft 450.

At the center of the shaft 450 an upwardly and slightly rearwardly inclined arm 460 is rigidly secured. The arm 460 is pivotally secured by means of a pin 466 to a rod 468 of a hydraulic jack. The hydraulic jack is provided with a cylinder 470 which extends rearwardly from the arm 460.

The rearward end of the jack 470 is attached by means of a tab 472 and a pin 476 to two upwardly extending ears 480. The ears 480 are attached to a mounting piece 482 and the latter is secured on top of the longitudinal pipe 230.

On the outer end of the shaft 450 two other arms 500 are rigidly secured. The arms 500 extend upwardly and slightly rearwardly, being much longer than the arms 460. Each arm 500 is provided with a plurality of longitudinally spaced apart apertures 510 therein. The latter are for the purpose of receiving bolts 512 which latter pivotally secure each arm 500 to the bifurcated forward ends 514 of connecting rods 516. Across the forward side of the arms 460 and 500 connecting brace 506 is secured.

The connecting rods 516 extend rearwardly and are of telescopic construction. The rearward end portions of the rod assembly are sleeves 518 which latter receive the rods 516 therein. The inside of the sleeves 518 are threaded as shown at 519 for threadedly receiving the threaded rearward end of each rod 516. On the rods 516, adjacent the forward end of each sleeve 518, two nuts 520 are provided for locking the rod into position.

The rearward ends of each sleeve 518 are bifurcated as shown at 524 and they are pivotally secured by means of bolts 530 to upwardly extending shafts 532. The shafts 532 extend upwardly from and are secured to the elongated angle members 20 to which the teeth 10 are secured.

As best seen in Figure 4, at times when hydraulic power is applied to the jack 470 through its hose 550, the associated members are caused to assume the dotted line positions shown. When they are in the dotted line position, the teeth 10 of the rake will be in raised position due to the rotation of the angle members 20 as best seen in Figures 4 and 10.

As best seen in Figures 1 and 6, the inner ends of the pipe axles 30 are each provided with a transverse sleeve 602 secured thereto. The sleeve 602 is for the purpose of receiving bolts 604 therethrough. Since the bolts are rotatably received, each sleeve 602 is provided with an oiling aperture having a cap 610 thereover.

The bolts 604 are each disposed through the ends of two spaced apart transverse plates 613. The plates 613 are disposed about the longitudinal pipe 230 and are welded thereto. As thus described the axle pipes 30 are adapted to swing upwardly and downwardly whereby positions of the lower ends of the teeth 10 are adapted to conform to the surface of the ground. Pins 611 and washers 612 are disposed on the forward ends of the bolts 604.

It will be seen that the bolts 604 are preferably disposed in alignment with the respective bolts 260 at the forward ends of the brace rods 250 whereby the brace rods 250 and axles 30 can swing together respectively, with freedom.

Cross bracing is provided beneath the axle pipes 400. Such bracing includes a bracing pipe 702 extending between and secured to the brackets 110' which latter are similar to but slightly different than the brackets 110 of the wheel 90. A strap brace 704 is provided, as best shown in Figure 11. The strap brace 704 extends upwardly and is secured to the pipe 230.

The strap 704 extends under the pipe 702 and then upwardly again, being secured at its rearward end to the longitudinal pipe 730. The forward end of the strap 704 is shown in the lower left hand side of Figure 4. The rearward end of the strap 704 is also shown in Figure 4. In addition to the strap 704, a vertically disposed brace 708 is provided extending downwardly from the pipe axles 400 and suitably secured to the upper side of the straps 704.

Means are provided for locking the teeth 10 in the upper position shown in dotted lines in Figure 10. Such means includes two upwardly extending posts 802. The posts 802 extend upwardly from and are secured at their lower ends to the angle members 20 when the latter are in raking position. When the angle members 20 are in the "up" position, the posts 802 are in the dotted line positions shown in Figure 6.

In such a position the posts 802 are disposed with the apertures 804 on their upper ends between nibs 810 which latter are arranged in two pairs, one pair on the outer end of each of these axles 530. The nibs 810 are provided with apertures for receiving bolts 812 having cotter pins 814. The bolts 812 are for securing the posts 802 in a horizontal position to hold the teeth 10 in the upper position.

This invention has provided a hayrake adapted for use in fields having varying conditions including uneven ground surfaces, uneven hay growth, and bogs; and has further provided a hayrake having a positive hydraulic hold-down for cleaner raking.

From the foregoing description, it is thought to be obvious that a hay rake constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A hay rake comprising: a draft frame having a forward end and a rearward end; supporting wheels operatively connected to said draft frame; first and second elongated axles disposed one on each side of said draft frame and extending transversely outwardly therefrom; horizontal longitudinally extending pivot means attaching the inner ends of said axles to said draft frame whereby the outer ends of said axles can swing vertically with respect to said draft frame about horizontal longitudinally extending pivot axes; first and second end wheels on the outer ends of said axles and disposed for rotation in planes transverse to said axles; a first and a second brace means respectively disposed in front of said first and second axles with each brace means attached to an outer end of the respective axle and pivotally attached to the forward end of said draft frame for swinging about longitudinal horizontal axes in alignment respectively with said axle pivot axes; first and second rake heads pivotally mounted on said first and second axles; rake teeth mounted on and extending rearwardly from said rake heads; and means for causing rotation of said rake heads to raise and lower said teeth.

2. A hay rake as claimed in claim 1 in which said draft frame wheel means comprises two wheels disposed one on each side of said draft frame.

3. The hay rake of claim 1 further having a first one of said axle carrying wheels attached to said first axle by means operatively associated with said first wheel and its axle for mounting said first end wheel either in a position at a right angle to its axle for raking or in a position in parallelism with its axle for highway travel; means mounting a second axle wheel on said second axle transversely to said second axle and said second axle wheel mounting means being adapted to be removed; means on the rearward end of said draft frame for attaching said second axle wheel mounting means thereto for positioning said second axle wheel in a position for rotation in a plane transverse to said draft frame for road travel; and mounting means for said draft frame wheel means for securing said draft frame wheel means in either of two positions disposed at a right angle to or longitudinally of said draft frame for road travel and raking respectively.

4. The hay rake of claim 1 further having a first one of said axle carrying wheels attached to said first axle by means operatively associated with said first wheel and its axle for mounting said first end wheel either in a position at a right angle to its axle for raking or in a position in parallelism with its axle for highway travel; means mounting a second axle wheel on said second axle transversely to said second axle and said second axle wheel mounting means being adapted to be removed; means on the rearward end of said draft frame for attaching said second axle wheel mounting means thereto for positioning said second axle wheel in a position for rotation in a plane transverse to said draft frame for road travel; and mounting means for said draft frame wheel means for securing said draft frame wheel means in either of two positions disposed at a right angle to or longitudinally of said draft frame for road travel and raking respectively; a tongue extending longitudinally and forwardly from said draft frame; means removably securing said tongue to the forward end of said draft frame; and means for attaching said tongue to the end of said second axle when said second axle wheel has been removed for towing said hayrake.

WAYNE P. ADAMS.

References Cited in the file of this patent

UNITED STATES PATENTS

| Number | Name | Date |
| --- | --- | --- |
| 1,052,467 | Drager | Feb. 11, 1913 |
| 1,177,104 | Hendricks | Mar. 28, 1916 |
| 1,502,507 | Link | July 22, 1924 |
| 1,700,158 | Dugan | Jan. 29, 1929 |
| 1,815,330 | Robinson | July 21, 1931 |
| 2,237,280 | Coultas et al. | Apr. 1, 1941 |
| 2,471,713 | Baker | May 31, 1949 |
| 2,526,028 | Johnson | Oct. 17, 1950 |